United States Patent [19]

Ziegler

[11] 4,019,988
[45] Apr. 26, 1977

[54] DIALYZER MEMBRANE SEAL AND TUBING CONNECTOR

[75] Inventor: Lloyd L. Ziegler, Collegeville, Pa.

[73] Assignee: Extracorporeal Medical specialities Inc., King of Prussia, Pa.

[22] Filed: Aug. 28, 1975

[21] Appl. No.: 608,627

[52] U.S. Cl. .......................................... 210/494 R
[51] Int. Cl.² ................... B01D 29/06; B01D 13/00
[58] Field of Search ............. 210/321, 433 M, 448, 210/450, 454, 455, 494 R, 493 M

[56] References Cited

UNITED STATES PATENTS

| | | | |
|---|---|---|---|
| 2,686,154 | 8/1954 | MacNeil | 210/455 X |
| 3,390,779 | 7/1968 | Kumme et al. | 210/321 B |
| 3,565,258 | 2/1971 | Lavender | 210/321 B |
| 3,668,837 | 6/1972 | Gross | 210/321 B X |
| 3,705,652 | 12/1972 | Russmann et al. | 210/321 B |
| 3,792,978 | 2/1974 | Freedman | 210/321 B X |
| 3,857,785 | 12/1974 | Martinez | 210/321 B |
| 3,892,664 | 7/1975 | Van Assendelft et al. | 210/321 B |

*Primary Examiner*—Frank A. Spear, Jr.
*Assistant Examiner*—Ferris H. Lander
*Attorney, Agent, or Firm*—Connolly and Hutz

[57] ABSTRACT

Improved means of sealing the ends of tubular permeable membrane material in a dialyzer coil and providing connections to associated inlet and outlet tubing is disclosed. The tubular membrane material is sealed by clamping the ends thereof to the support material which provides an improved flow path of blood into and out of the permeable membrane material eliminating thrombus formation, clotting and flow restrictions within the dialyzer. A simplified and leakproof tubing connector is also disclosed.

9 Claims, 9 Drawing Figures

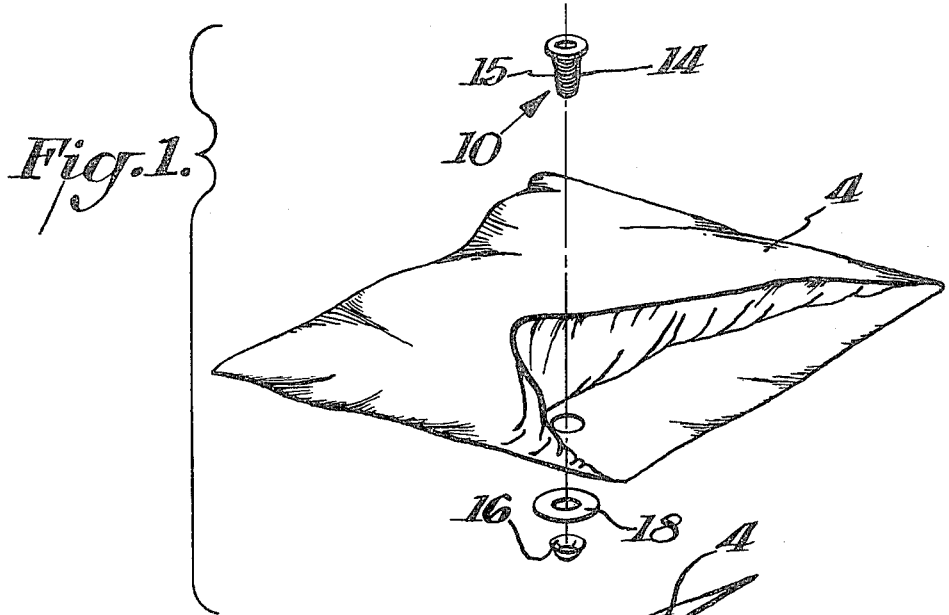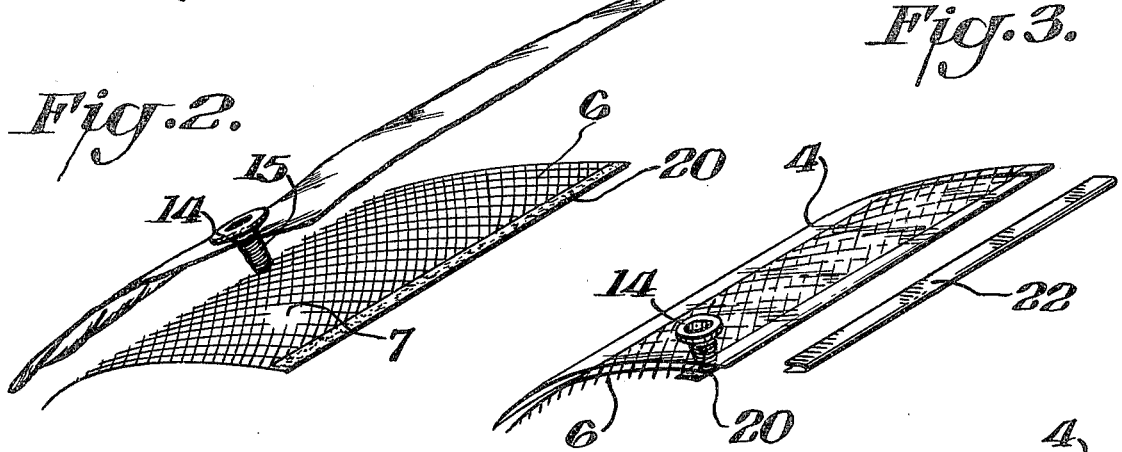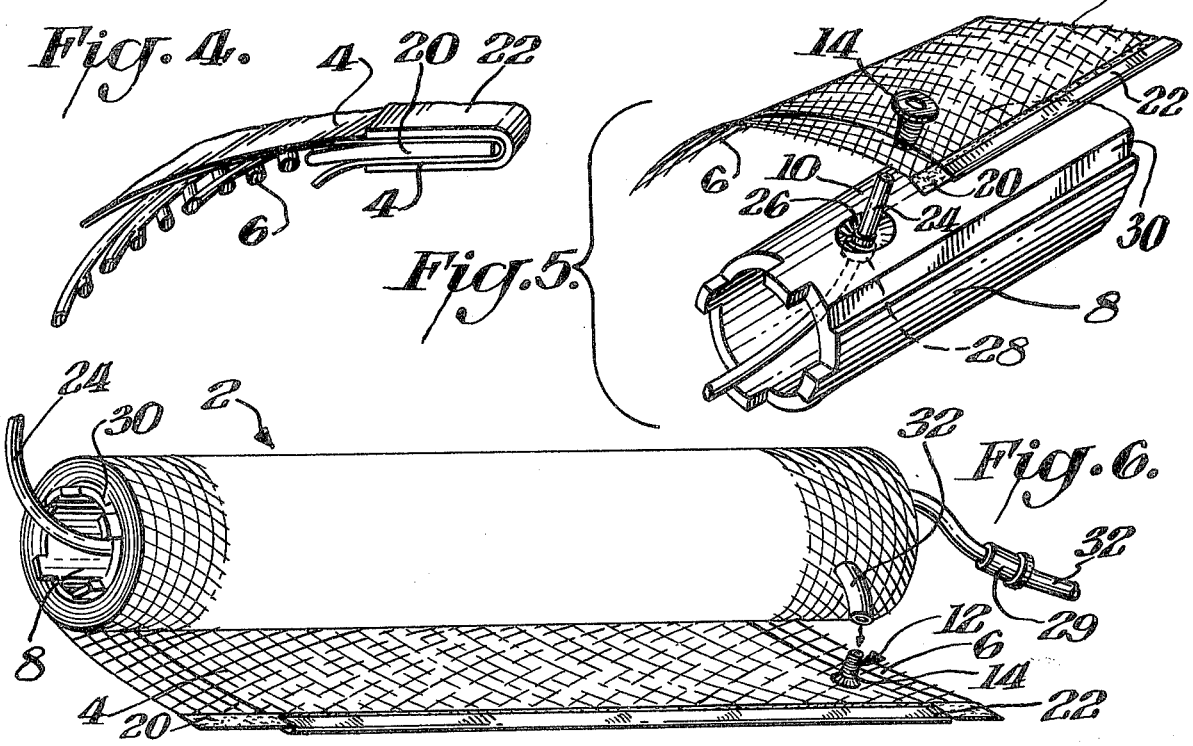

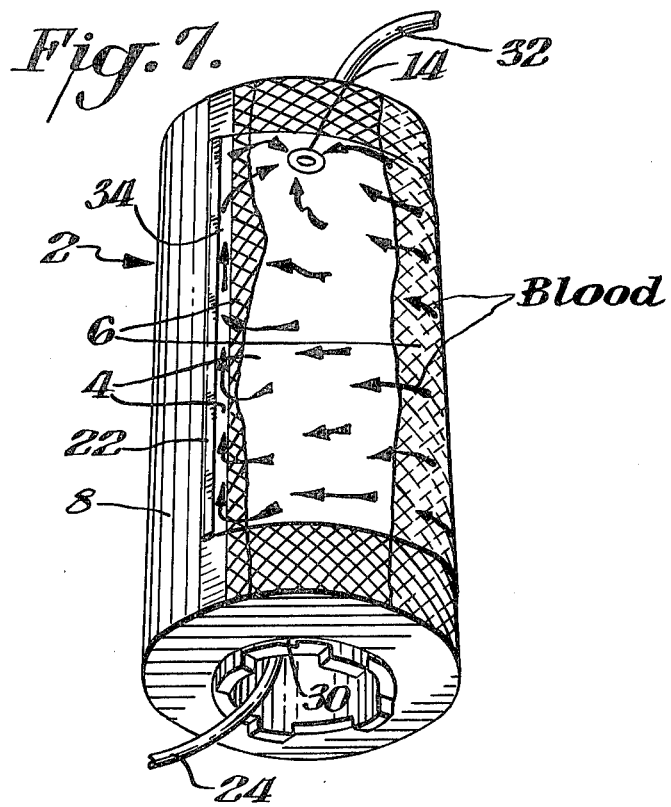
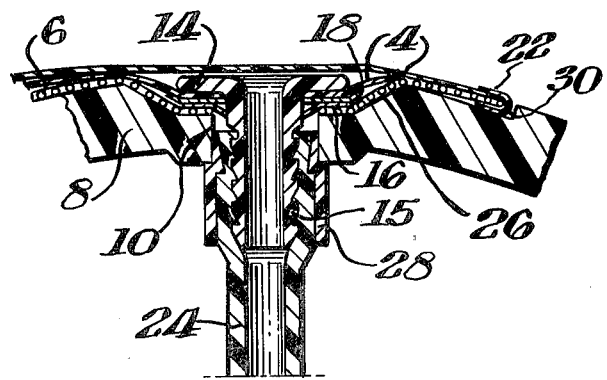
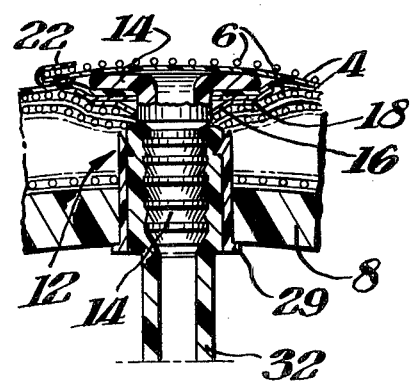

DIALYZER MEMBRANE SEAL AND TUBING CONNECTOR

BACKGROUND OF THE INVENTION

This invention relates to the field of separation in which different fluids are separated by a permeable membrane so that one or more components of one fluid will pass through the membrane to the other fluid, such as in dialysis and desalination. For purposes of illustration the disclosed and claimed invention relates particularly to an artificial kidney system for treating human blood and more specifically to improvements in coil type dialyzers.

Numerous coil dialyzers are presently on the market and generally comprise a central relatively rigid core on which is wound open mesh support material and flattened tubular permeable membrane material. This type of device, however, has a basic problem in that a physical transition must be made in the shape of the membrane material from its rather wide flattened state inside the coil to a gathered, round shape at each end where it is mated with the external tubing connectors. In this transition zone numerous overlapping folds of the permeable membrane material create stagnant areas where dangerous blood clots can form and in some instances actually stop flow of blood. The gathering of the permeable membrane around the tubing connectors during manufacture also substantially increases the chance of puncturing or tearing the membrane creating dangerous leakage paths between dialysate and blood. The gathering also can create excess thicknesses which prevent a proper seal with the tubing connector introducing yet another leakage path.

One approach taken by the prior art to minimize the effects of gathering membrane tubing around tubing connectors is illustrated in Miller U.S. Pat. No. 3,508,662 issued Apr. 28, 1970. The Miller patent discloses an enlarged tubing connector to minimize the number of folds in the permeable membrane as it is gathered around the tubing connector, but even this commercially successful approach does not completely obviate the aforementioned problems.

Another disadvantage of gathering the permeable membrane material around the tubing connectors is that of the excess fluid weight in the permeable membrane tubing pulling on the connector which opens up leakage paths and accelerates tearing of the membrane. This problem is illustrated in FIG. 5 of the Miller '662 patent which shows a large area of tubing full of blood hanging from the tubing connector. This weight coupled with pulsations from the blood pump creates a dangerous propensity for leakage.

Another prior art device which has addressed itself to some of these problems is a dialyzer made by AMCO, Model DC-7. This device contains a flattened channel with preformed tubing connectors therein which is heat molded onto the ends of the flattened permeable tubing. While this avoids the problem associated with gathering the permeable tubing around a connector the channel is quite bulky and the need for heat to mold the channel around the permeable membrane tubing substantially increases the likelihood of leakage in the tubing. Also this device does not solve the problem of the weight of blood pulling on the tubing connector.

SUMMARY OF THE INVENTION

This invention provides an inexpensive, disposable low-prime artificial kidney coil unit for use in an artificial kidney system. The dialyzer coil comprises an inner core with a single elongated tubular membrane providing a spiral blood passage and a single length of membrane support material spirally wrapped in sandwich relationship to each other around the core. The membrane support material can consist of either woven or non-woven plastic mesh, embossed sheet or film, or materials having an open pore structure.

Unlike other coil dialyzers in the prior art, this invention firmly secures both ends of the permeable tubing to the support material in a manner which avoids the difficulties associated with the prior art practice of gathering the membrane tubing in folds and slipping it over the tubing connector. More specifically, in this invention the tubing is allowed to remain in a flattened state at both ends and is physically clamped to the support material in a manner to be explained in more detail below. This physical connection between the permeable membrane and the support material provides a uniform distribution of the weight of blood within the permeable tubing. With the blood evenly distributed throughout the tubing, there is no tendency for the permeable tubing to pull away from the tubing connectors such as occurred in the prior art dialyzers. Also the mechanical clamping of the permeable tubing to the support material is so arranged that an improved blood flow path is created at the end of the tubing which directs blood from the furthest corner of the permeable tubing toward the blood outlet.

The blood inlet and outlet tubing connectors of this invention are designed for simplicity of assembly and a minimization of stress or strain on the easily torn permeable membrane. The inlet and outlet tubing connectors comprise a flat flanged eyelet, compression washer and push nut which are inserted at both ends of the permeable tubing. The blood inlet and outlet tubing are then inserted over the end of the eyelet and clamped in place. Because all stress or strain on the permeable tubing developed by pulsation of blood therethrough is distributed through the support material rather than the blood inlet and outlet tubing connectors, the connectors of this invention are greatly simplified.

BRIEF DESCRIPTION OF THE DRAWINGS

Numerous advantages of the present invention will become apparent to one skilled in the art from a reading of the detailed description in conjunction with accompanying drawings wherein similar reference characters refer to similar parts and in which:

FIG. 1 is an illustration of the permeable membrane tubing showing elements of the blood inlet assembly;

FIG. 2 is an exploded perspective view of the permeable tubing with inlet assembly in place positioned adjacent to the support material;

FIG. 3 is another view of the permeable tubing, support material showing the tubing clamp;

FIG. 4 is an enlarged fragmentary view of the tubing clamp in position holding the membrane tubing to the support material;

FIG. 5 is an exploded perspective view illustrating the interconnection between the blood inlet assembly and inlet tubing just prior to wrapping the tubing and support material on the dialyzer core;

FIG. 6 illustrates the arrangement of the blood outlet assembly and its interconnection with the blood outlet tubing;

FIG. 7 is a partial cutaway of the assembled dialyzer coil of this invention showing the flow paths of blood at the outlet end of the permeable tubing as the blood flows toward the blood outlet assembly;

FIG. 8 is a detailed fragmented cross-sectional view of the blood inlet assembly and tubing clamp;

FIG. 9 is a detailed fragmental cross-sectional view of the blood outlet assembly and tubing clamp.

DETAILED DESCRIPTION

Referring in more particularity to the drawings there is illustrated an improved dialyzer coil 2 which in conventional fashion involves the coiling in spiral fashion of permeable membrane tubing 4 and support material 6 around a core 8 (FIG. 7). The unique inlet and outlet port assemblies 10 and 12 are illustrated in more detail in FIGS. 1, 2, 5, 6, 8 and 9. More particularly, as shown in FIG. 1 the inlet port assembly comprises a flat flange eyelet 14 which is placed in a hole near the end of the permeable tubing 4 and held in place by push nut 16. The shank of the eyelet is preferably formed with barbs or ridges 15 to improve retention of the inlet and outlet tubing 24, 32 on the eyelet. A compression washer 18 is placed between the outer surface of the permeable tubing and the push nut 16 in order to assure a proper seal of the membrane 4 at the flange of the eyelet 14; prevent tearing of the membrane 4 by the push nut 16; and protect the membrane 4 from possible puncture by a sharp or ragged edge at hole 7 in the support material 6.

The membrane tubing 4 with the inlet assembly 10 is then placed over support material 6 through which a hole has been bored to accommodate the end of the inlet assembly. The support material is also flattened at the end by heating or compression to form an impermeable strip 20. As illustrated in FIG. 4 the membrane tubing 4 is then folded over the strip 20 on support material 6 and the membrane tubing and the support material clamped together with tubing clamp 22. The clamp is designed such that with adequate pressure applied thereto it will maintain a fluid tight seal at the ends of the tubing 4 and a mechanically tight seal between the tubing 4 and support material 6. Also, because the clamp extends the entire width of the tubing 4 it distributes all weight of fluid across the entire width of the support material 6 thus transferring the weight of blood in the tubing from the inlet and outlet assemblies 10, 12 to the support material where it may be more evenly distributed.

The blood inlet assembly 10 is connected to blood inlet tubing 24 which has passed through a hole 26 in core 8 by inserting the shank 15 of eyelet 14 into tubing 24. The connection between the blood inlet tubing 24 and the blood inlet assembly 10 is secured with a retainer clamp 28 as illustrated in FIG. 8. The retainer clamp 28 serves the dual function of securing the tubing 24 to inlet assembly 10 and holding the inlet assembly 10 with associated membrane tubing 4 and support material 6 in position against core 8. In one embodiment of this invention the retainer clamp 28 is formed as part of the core 8 when the latter is molded. A longitudinal notch 30 is provided in the core to accept the membrane tube clamp so that in the assembly the clamp will be positioned flush and tangent to the periphery of the core, permitting a gradual transition from the level of the first layer of membrane and support material to the successive layers on top of it.

To complete the assembly of the dialyzer coil 2 the permeable tubing 4 and support material 6 are wrapped around the core a sufficient number of times to produce the desired amount of transfer area for the particular dialyzer coil. Towards the end of the wrapping procedure the permeable membrane tubing is shifted slightly to one side as shown in FIG. 6. This is done so that the outlet assembly 12 which is identical to the inlet assembly 10, can be interconnected with blood outlet tubing 32. As with the inlet assembly 10 the outlet assembly 12 is clamped to blood outlet tubing 32 with a suitable retainer clamp 29. As with the inlet end, a tubing clamp 22 is used to seal the ends of tubing 4 and secure it to support material 6.

The dialyzer coil 2 as fully assembled is illustrated in FIG. 7. As will be noted from that figure, blood flowing spirally around the coil maintains laminar flow at all points within the permeable membrane tubing 4. As it reaches the end of the tubing it courses along the channel formed by strip 20 and tubing clamp 22. More particularly, the strip 20 is formed approximately ¼ inch wider than the tubing clamp 22 so as to form a channel 34 at the end of the membrane tubing 4 through which the blood will flow to the outlet assembly 12. This channel 34 prevents stagnation of blood at the end of the membrane tubing which might cause clotting or otherwise interfere with the flow of blood through the dialyzer coil.

I claim:

1. In a dialyzer coil comprising a core with permeable tubing and support material spirally wound thereon, blood inlet and outlet assemblies secured to the permeable tubing and a tubing clamp extending the length of at least one end of said permeable tubing to mechanically seal said tubing and secure it to the support material to promote transfer of the fluid weight in said tubing to the support material.

2. The dialyzer coil of claim 1 wherein the blood inlet and outlet assemblies comprise a flanged eyelet, push nut and compressible washer.

3. The dialyzer coil of claim 1 wherein an impervious strip is formed along at least one edge of the support material.

4. The dialyzer coil of claim 3 wherein the permeable tubing is folded over the strip formed along the edge of the support material and sealed to the support material by the tubing clamp.

5. The dialyzer coil of claim 4 wherein the impervious strip on the support material is wider than the tubing clamp to form a channel along the strip to promote fluid flow to and from the blood inlet and outlet assemblies.

6. The dialyzer coil of claim 1 wherein the core contains a recessed bore to receive the blood inlet assembly.

7. The dialyzer coil of claim 1 wherein the core contains a longitudinal notch to receive a tubing clamp.

8. The dialyzer coil of claim 1, wherein inlet and outlet tubing are connected to the inlet and outlet assemblies by retainer clamps.

9. The dialyzer coil of claim 8 wherein the retainer clamp for the inlet assembly is formed in the core.

* * * * *